(12) United States Patent
Allan

(10) Patent No.: US 6,584,096 B1
(45) Date of Patent: Jun. 24, 2003

(54) METHOD AND APPARATUS FOR CONNECTING A HOME NETWORK TO THE INTERNET

(75) Inventor: Ian David Allan, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/222,835

(22) Filed: Dec. 30, 1998

(51) Int. Cl.[7] .............................................. H04L 12/66
(52) U.S. Cl. ...................................................... 370/352
(58) Field of Search ................................. 370/401, 402, 370/431, 432, 462, 463, 389, 392, 403, 404, 465, 471, 475, 485, 486, 487; 709/225, 238, 245, 203, 217, 219

(56) References Cited

U.S. PATENT DOCUMENTS

| | | | | |
|---|---|---|---|---|
| 5,371,852 A | * | 12/1994 | Attanasio et al. ............ | 395/200 |
| 5,636,216 A | * | 6/1997 | Fox et al. ..................... | 370/402 |
| 5,708,655 A | * | 1/1998 | Toth et al. .................... | 370/313 |
| 5,751,971 A | * | 5/1998 | Dobbins et al. ........ | 395/200.68 |
| 5,790,541 A | * | 8/1998 | Patrick et al. ............... | 370/392 |
| 5,920,699 A | * | 7/1999 | Bare ....................... | 395/200.55 |
| 6,058,431 A | * | 5/2000 | Srisuresh et al. ........... | 709/225 |
| 6,091,732 A | * | 7/2000 | Alexander et al. .......... | 370/389 |
| 6,128,298 A | * | 10/2000 | Wootton et al. ............. | 370/392 |
| 6,130,892 A | * | 10/2000 | Short et al. .................. | 370/401 |
| 6,353,614 B1 | * | 3/2002 | Borella et al. ............... | 370/389 |
| 6,421,732 B1 | * | 7/2002 | Alkhatib et al. ............. | 709/245 |

OTHER PUBLICATIONS

ADSL Forum 98–216, Nov. 1998, entitled: "The Architecture of PPP Extensions for Customer Premise Lans".

* cited by examiner

Primary Examiner—Chau Nguyen
Assistant Examiner—Soon-Dong Hyun (57) ABSTRACT

A method and apparatus for connecting a home network to the Internet using the ports or sockets of the home gateway to multiplex the data flow. The devices on the home network may be client or server applications. The home gateway has a single Internet address. Unicast and multicast data flows to the home network are supported. The apparatus includes the home network and a home gateway. The home network includes at least one home network device. The home gateway includes at least one home gateway port. Each home network device is connected to at least one home gateway port. The home gateway is connected to the Internet. The home network includes means for autodiscovering, for each of the at least one home network device, the home Internet address. The method includes the steps of connecting at least one home network device to a home gateway using at least one home gateway port, connecting the home gateway to the Internet using a single Internet address and autodiscovering, for each of the at least one home network device, the home Internet address.

12 Claims, 11 Drawing Sheets

METHOD AND APPARATUS FOR CONNECTING A HOME NETWORK TO THE INTERNET

FIELD OF THE INVENTION

The present invention relates generally to Internet protocol, and more specifically, to connecting a home network to the Internet.

BACKGROUND OF THE INVENTION

Traditionally, the Internet has been connected to homes through modems. Many homes, however, have multiple devices. These devices include appliances such as telephones, fax machines, televisions, ovens, lights, and the like. It is sometimes desirable to network these devices to enable control of these devices and also information exchange between them. For example, with networked devices, one device may receive instructions from another, or multiple devices could be controlled remotely by a third device. Further, it may be desirable to have this home network to have access to, and be accessed by, the outside world. Traditionally, the home service set only supports a single end point due to the complexities of topology management and address space depletion that supporting IP subnets in the home implies. There is a need to have a home network visible to the rest of Internet. If this is the case, then each device on the network could send and receive information using the Internet.

There are a number of known systems that connect a home network to the Internet. One such system, known as a full router, assigns each device on the home network a unique Internet address. In this implementation, the home is not the end, or stub, connection but instead the home network is a sub-network. This implementation also increases the complexity of network administration while minimizing opportunity to re-use IP addresses across multiple customers.

Another known system which alleviates the address problem is call Network Address Translation, or NAT. NAT is a 1:1 address translation, that is, for every address in the home network there is a corresponding address at the NAT. Another version of NAT, called Port Based NAT, uses a N:1 translation as a single address is shared by multiple end-systems on the home network.

In NAT and Port Based NAT, the home remains the stub connection on the Internet and circuitry in the home translates the incoming information to the required devices using internal network addresses. This address translation introduces additional address topology complexity into the home network, which is undesirable. Furthermore, the home network addresses are private and the devices in the home network are not visible to the outside world. Hence, an incoming signal can not contact a specific device without that device first setting up the connection. Therefore, only client applications are supported and server based applications are not. An additional problem with NAT is that is breaks the end-to-end model required by such services as IP security (IPSEC).

Port Based NAT associates each internal address with a socket. While the Internet address may specify the location of a computer platform on a network, a socket, or a port as it is sometimes known, has been traditionally used to specify a particular application on that computer platform. Typically, ports have allowed multiple applications to share a single address, and therefore using ports, an Internet protocol data stream can be demultiplexed to the various applications on the computer platform. Thus, Port Based NAT maps the address of a the device on the home network to a single Internet address and a specific port. The disadvantage of Port Based NAT is that although the devices are able to connect to outside the home, the outside world is not able to see the mapping of the ports and instead only the single Internet address. Therefore, as in NAT, only client applications are supported and server based applications are not.

Therefore, NAT and Port Based NAT permit a home network that is an Internet protocol based sub-network transparent to the service model of a single public address. NAT and Port Based NAT, however, interfere with the home service set, such as, IPSEC as already mentioned, electronic commerce, multiplayer gaming and the like.

Thus, there remains the problem of supporting an arbitrary number of devices in the home while being transparent to the single Internet identity service set.

For the foregoing reasons, there is a need to provide an apparatus and method for client and server based applications for devices on a home network connected to the Internet through a single Internet address.

SUMMARY OF THE INVENTION

The present invention is directed to an apparatus and method for client and server based applications for devices on a home network connected to the Internet through a single Internet address.

An embodiment of the present invention is an apparatus for connecting a home network to the Internet using a single Internet address. The home network has at least one home network device. The apparatus includes a home gateway connected to the Internet and includes at least one home gateway port. Each home network device is connected to at least one home gateway port. The home network further includes means for autodiscovering, for each of the at least one home network device, the home Internet address.

Another embodiment of the present invention is a method for connecting a home network to the Internet. The method includes the steps of connecting at least one home network device to a home gateway using at least one home gateway port, connecting the home gateway to the Internet using a single Internet address and autodiscovering, for each of the at least one home network device, the home Internet address.

An advantage of the present invention is that the connection of the home network to the Internet supports unicast and multicast data streams, and client and server applications embodied in the home network devices.

BRIEF DESCRIPTION OF THE DRAWINGS

These and other features of the invention will become more apparent from the following description in which reference is made to the appended drawings in which.

DETAILED DESCRIPTION OF THE PREFERRED EMBODIMENTS OF THE INVENTION

By way of overview, the present invention is first described generally. Following this description, the structure and operation of the embodiments of the present invention are described in more detail. Advantages of the present invention are then described, and also further alternative embodiments.

Although ports have been traditionally associated with applications hosted on a specific computer platform, it is possible to use a port as part of a distributed architecture. Ports may be used as an additional layer of multiplexing to permit an IP network end point to be fanned out into a constellation of devices in the home. This requires the definition of a protocol to permit port administration for the network end point to be localized on one platform in the home network.

Further, a protocol may permit distributed port administration for a single Internet address to be extended across the home Local Area Network (LAN). Thus, the protocol to implement the above may be called Internet Protocol Residential Protocol (IPRP). IPRP augments the normal implementation of IP in the home to permit multiple local end points to port multiplex together onto a single network end point instead of supporting direct IP peer communication between the network elements in the home. Usually the connectivity to the Internet is an overlay on the home network and intra-home connectivity does not require a network layer. The network layer, or IP layer as it is sometimes known, is the protocol handling of Internet protocol (IP).

The IPRP splits the IP layer in the home into a client server model. The clients reside in the devices and offer traditional IP layers to the higher layers in each device. The server administers the ports, forwards data traffic to the specific clients on the basis of port demultiplexing, interdicts client data traffic where appropriate and filters incoming data traffic from the Internet.

The architecture to implement the IPRP includes a residential gateway which terminates the network stack layer and fans port data traffic out to the devices on the home LAN. The residential gateway maintains bindings between particular end-systems and ports of interest such that the port numbers (both UDP and TCP) function as a form of subnet addressing in the home. As devices are turned on, they register "ports of interest" with the home gateway. Data traffic from the Internet to unregistered ports is silently discarded by the residential gateway. Existing home networking does not require a network address plan to function, so the "network neighbourhood" continues to function independent of Internet services.

Therefore, as far as the outside world is concerned, the home is a single host address. The home gateway, however, controls which device or combination of devices connects, or has visibility to, to the outside world. An advantage of this configuration is that each home device is accessed as if the device were directly connected to the outside world. Also, this implementation uses a minimal amount of resources. A further advantage is that the home is hidden from the network. Usually an IP address plan requires a high amount of administration and is analogous to requiring extra phone numbers when adding extra phones lines to a home. The present invention is analogous to extending a single phone line as a bus through the home.

With reference to FIGS. 1 to 4, embodiments of the invention are now described. The invention includes a home network 10 and a home gateway 12. The home network 10 includes at least one home network device 14. The home gateway 12 includes at least one home gateway port 16. Each home network 14 device is connected to at least one home gateway port 16. The home gateway 12 is connected to the Internet 18. Throughout this description, a connection is defined as a transfer of data embodied on a signal. Usually, the connection is achieved using a wire, transmission line, bus, waveguide, fibre optics or similar signal wave guiding means. Wireless connections using antennas are also possible. Indeed, any transmission media may be used as long as there is the ability to have unicast, multicast and broadcast services.

Figure 1:
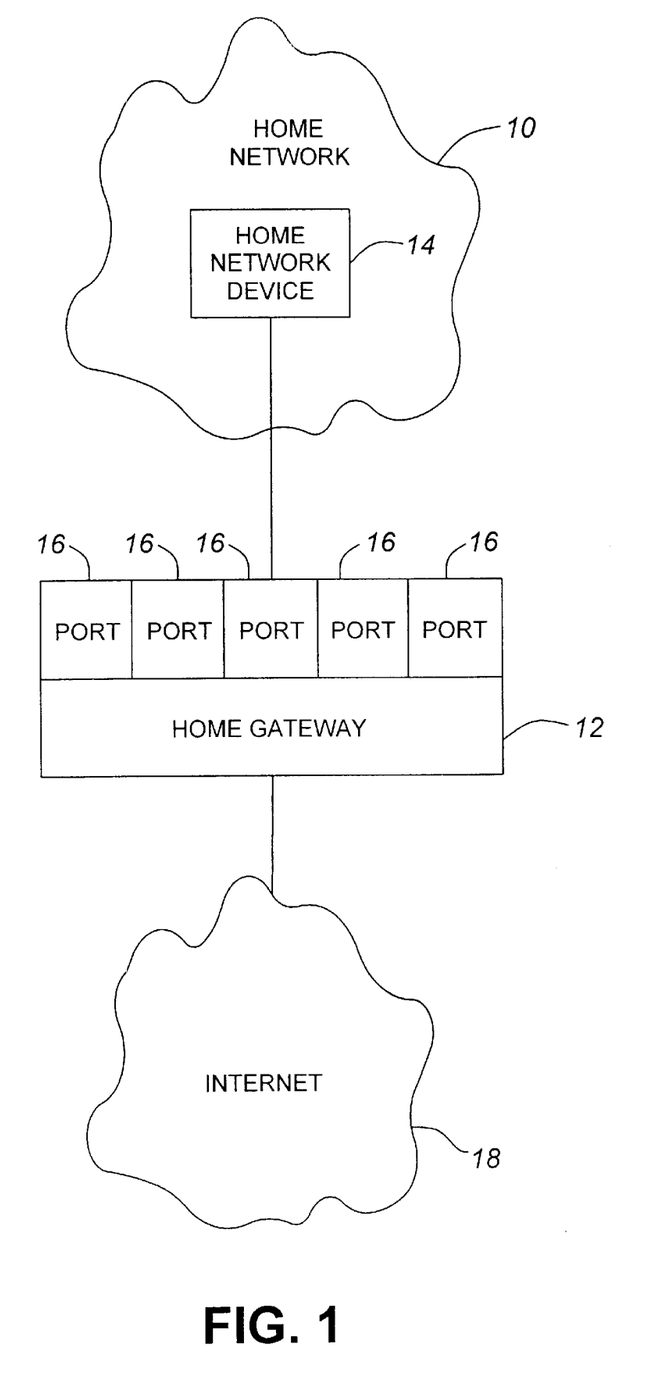
FIG. 1 illustrates a block diagram of an embodiment of the invention used for a unicast data stream and a client application.

FIG. 1 illustrates a block diagram of an embodiment of the invention used for a unicast data stream and a client application. A unicast data stream is data that flows between a single home network device and the outside world, namely the Internet. A client application is a home network device which initiates contact with the Internet.

Thus, in FIG. 1, the home network device 14 is connected to the home gateway 12 using a single home gateway port 16. This port 16 may be selected by the device 14 or the home gateway 12. The port 16 is only selected by the device 14 if it is attaching as a server, that is listening to the network, on what are known as "well known ports" defined for Internet applications. When the device 14 is functioning as a client of the network, the device 14 requests a port number from the home gateway 12. Therefore, the device type is usually not associated with a particular port 16, but instead the application that the device supports as a server may be associated with a "well known port".

Figure 2:
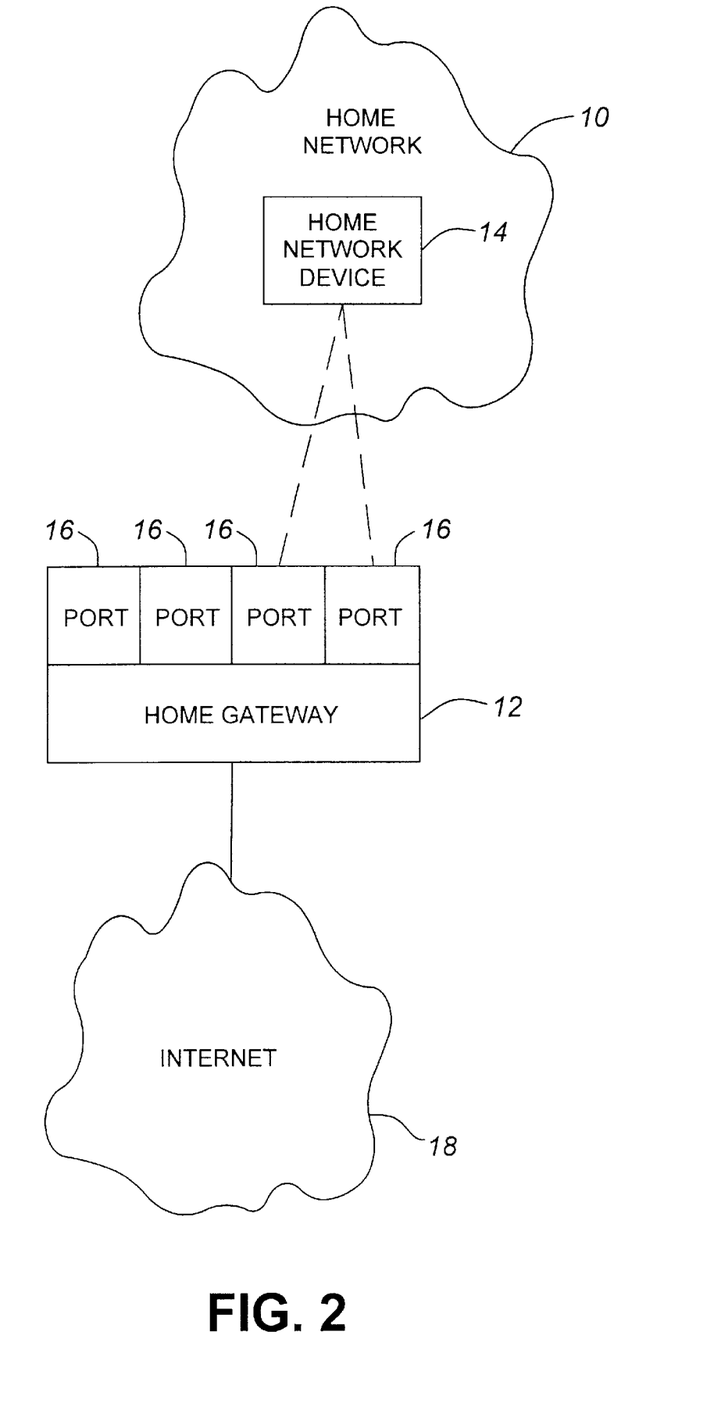
FIG. 2 illustrates a block diagram of an embodiment of the invention used for a unicast data stream and a server application.

FIG. 2 illustrates a block diagram of an embodiment of the invention used for a unicast data stream and a server application. A server application is a home network device which waits for initiation from the Internet. Usually, the device 14 is connected to a port 16 that is associated with the type of the device. This allows signals from the Internet attempting to reach the device 14 may be demultiplexed correctly by the home gateway 12 to a device 14 in the home wishing to offer or terminate the service. Often, when a signal is incoming from the Internet 18 the connection is changed to a second port 16, as indicated by the dotted lines in FIG. 2.

Figure 3:
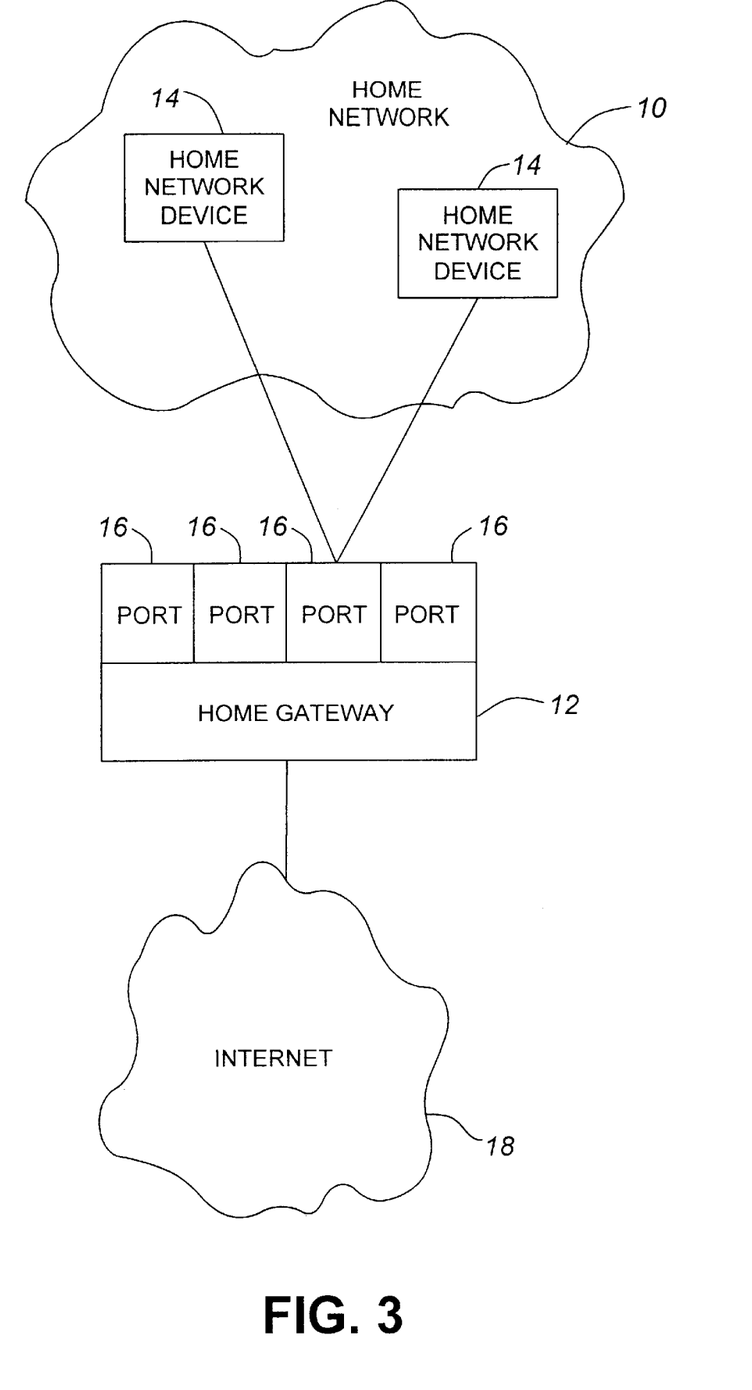
FIG. 3 illustrates a block diagram of an embodiment of the invention used for a multicast data stream and a client application.

FIG. 3 illustrates a block diagram of an embodiment of the invention used for a multicast data stream and a client application. In this embodiment an application is shared across multiple devices in the home. A multicast data stream is data that flows between two or more home network devices and the Internet. As shown in FIG. 3, the two devices 14 are connected to the same port 16.

Figure 4:
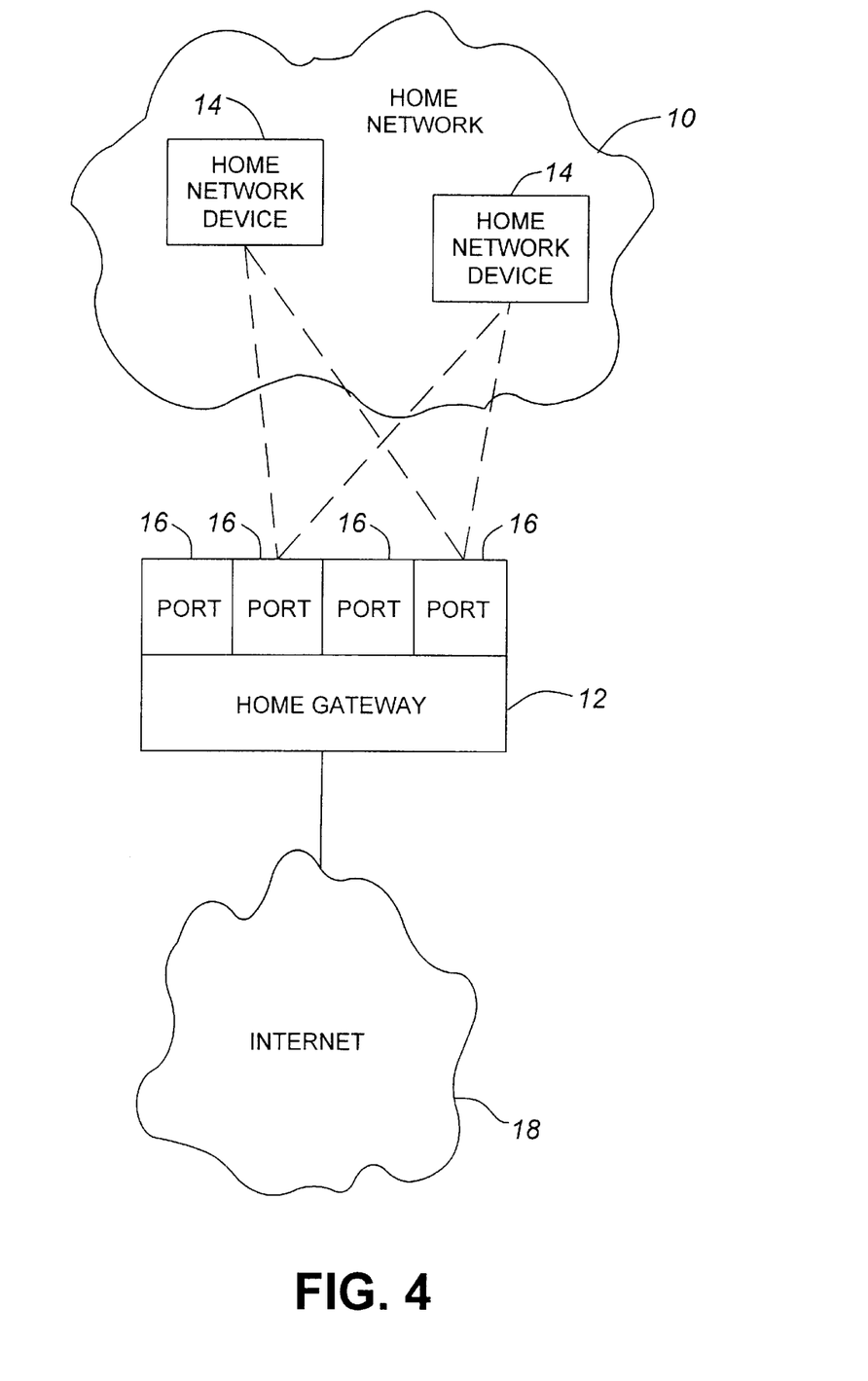
FIG. 4 illustrates a block diagram of an embodiment of the invention used for a multicast data stream and a server application.

FIG. 4 illustrates a block diagram of an embodiment of the invention used for a multicast data stream and a server application. This embodiment is similar to that illustrated in FIG. 2. After initial contact is made by the Internet to the devices 14, usually the connection is moved to a different port 16, as indicated by the dotted lines. In FIG. 4, however, two devices 14 are connected to the port 16.

In all FIGS. 1 to 4, there could be many more devices 14. Furthermore, all four individual embodiments may occur simultaneously, or in any combination, in another embodiment of the invention. Also, each home network device 14 may be connected to one of a predetermined range of home gateway ports 16, the range being determined by the home gateway 12. The predetermined range is usually a pool of ports 16 not specifically designated for a particular type of device 14.

The home network devices 14 may be a telephone, a facsimile machine, a computer implemented World Wide Web (WWW) browser, a home lighting system, a security system, a stove, a microwave, a dryer, a washing machine, a refrigerator, a TV, a stereo, a VCR, a DVD player, or any other home appliance that may be controlled or that may send or receive information.

Turning now to the operation of the various embodiments of the invention, reference is made to FIGS. 5 to 9.

Client applications, that is where the service is initiated from within the home, typically are handled as an unicast data stream. An unicast data stream is usually a single end-system bound to a single TCP or UDP port. There are, however, many server type applications, such as IP telephony, in which more than one end system in the home may be interested in implementing the application. A server application is something like telephony, e-mail or web page hosting in which the combination of an IP address and a "well known port number" serves as the traditional point of contact to serve the outside world. In many of these scenarios application layer interworking is used at the home gateway to convert the application from unicast to the IP layer address (which thinks it is dealing with only one end-system) to multicast to the community of interested end-systems in the home. It is usually desirable to do this within the context of a single protocol framework, such as IPRP, as opposed to a separate protocol.

Also, the ports are defined at the transport layer, thus an IP port is typically either a UDP port where the transport service is datagram, or a TCP port where the transport service is streaming data.

Figure 5:
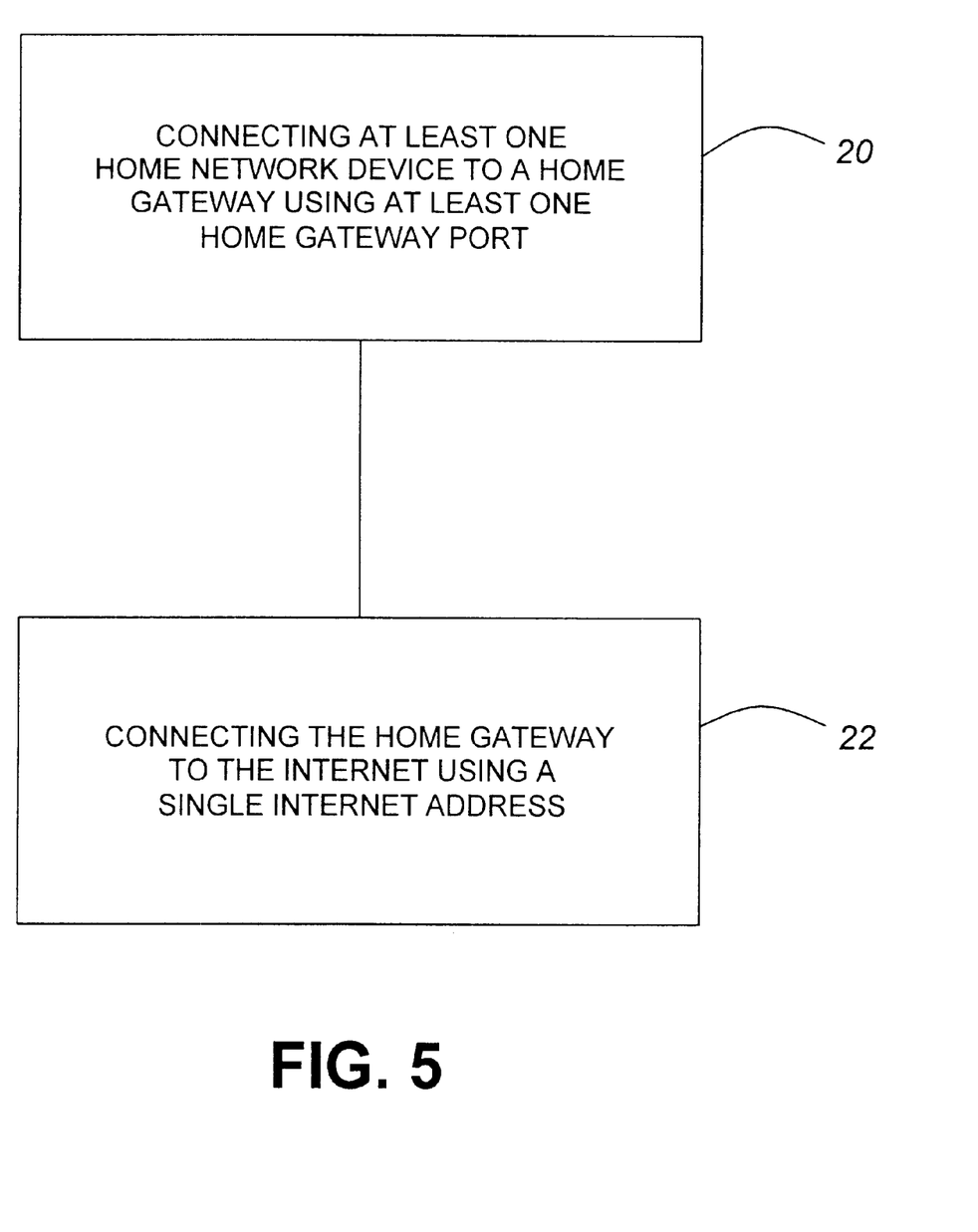
FIG. 5 illustrates a flow chart of the operation of an embodiment on the invention.

FIG. 5 illustrates a flow chart of the operation of an embodiment on the invention. Specifically, the method for connecting a home network to the Internet includes connecting a least one home network device to a home gateway using at least one home gateway port (step 20) and connecting the home gateway to the Internet using a single Internet address (step 22). It should be noted that connecting step 22 is often accomplished before the other steps, and sometimes the connection is established once at the start and then remains connected throughout the network operations. Also, the connecting of a least one home network device to the gateway step may include discovery of the gateway.

Figure 6:
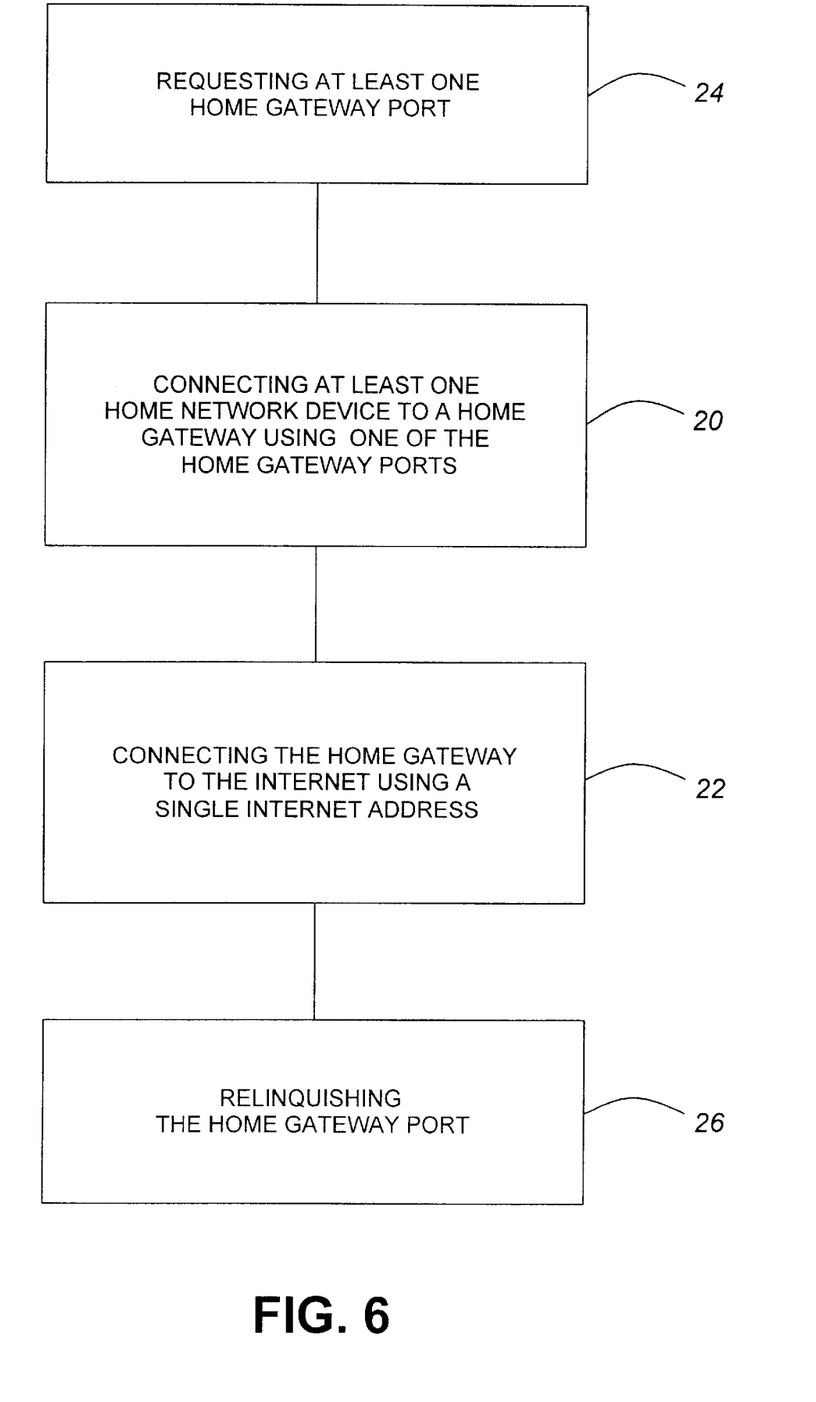
FIG. 6 illustrates a flow chart of the operation of an embodiment on the invention used for a unicast data stream and a client application.

FIG. 6 illustrates a flow chart of the operation of an embodiment on the invention using a unicast data stream and a client application device. The method includes the following steps:

requesting at least one home gateway port (step 24);

connecting at least one home network device to a home gateway using one of the home gateway ports (step 20). Step 20 uses an unicast data stream, and uses a client application device one as of the home network devices;

connecting the home gateway to the Internet using a single Internet address (step 22).

after the connection between the home gateway and the client application device is no longer required, relinquishing the home gateway port (step 26). A telephone, facsimile machine or other like device may be used as the client application device. Initially a home end-system applications needs connectivity to the outside world and therefore requests a port number from the internal interface. This request is translated into a request for a non-specific port to the home gateway. The home gateway obtains a single port from a pool of non-application specific ports and returns it to the end-system. At the same time, the home gateway records internally that there is a specific binding between the port number and the end-system local address such that it may demultiplex data traffic from the network to the correct local device. An example of a local end system address for specific media is an Ethernet MAC address. As an optional embodiment of the present invention, the home gateway may broadcast to all devices in the home and they could have sufficient information to determine local applicability of the information. Further, failure of the gateway or one or more end systems may cause binding information to become unsynchronized. Numerous mechanisms to recover synchronization are known in the art such as lease times for port numbers. The embodiments of the present invention compliment these recovery mechanisms by adding further reliability.

Figure 7:
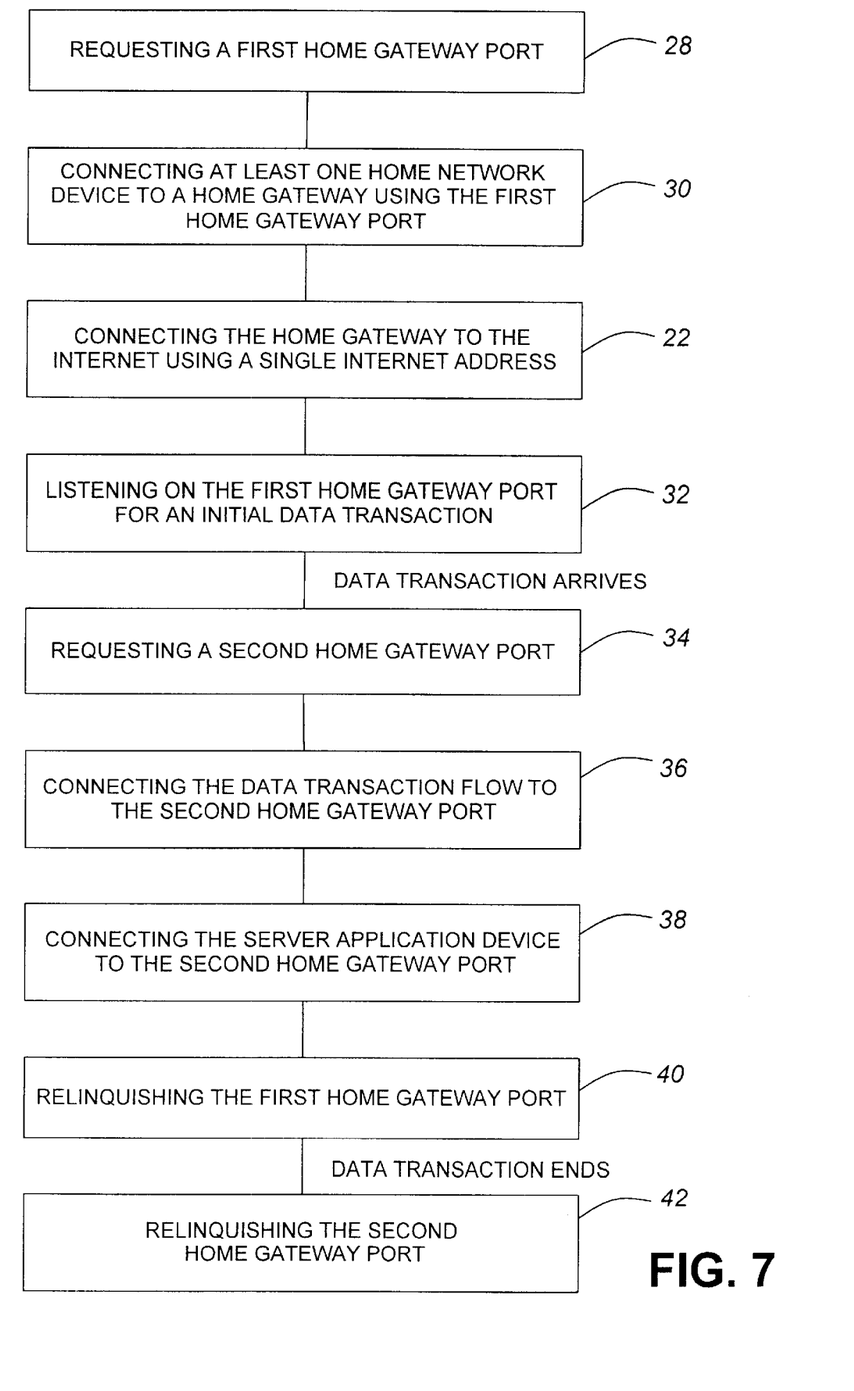
FIG. 7 illustrates a flow chart of the operation of an embodiment on the invention used for a unicast data stream and a server application.

FIG. 7 illustrates a flow chart of the operation of an embodiment on the invention using an unicast data stream and a server application. The method includes the following steps:

requesting a first home gateway port (step 28)

connecting at least one home network device to a home gateway using one of the home gateway ports (step 30). Step 30 uses an unicast data stream, and a server application device as one of the home network devices;

connecting the home gateway to the Internet using a single Internet address (step 22).

after connecting the server application device to the first home gateway port, listening on the first home gateway port for an initial data transaction (step 32);

after the initial data transaction arrives, requesting a second home gateway port (step 34);

after requesting the second home gateway port, connecting the data transaction flow to the second home gateway port (step 36);

after connecting the data transaction flow to the second home gateway port, connecting the server application device to the second home gateway port (step 38);

after connecting the server application device to the second home gateway port, relinquishing the first home gateway port (step 40). Optionally, the server application device may continue to listen for new data transactions on the first port while serving the existing application on the second port; and after the end of the data transaction flow, relinquishing the second home gateway port (step 42).

A telephone, a facsimile machine or other like device may be used a the server application device. In the embodiment of FIG. 7, the device or end-system requests a specific port number. Further, if the home gateway does not have sufficient knowledge to interwork unicast from the Internet to local multicast, it may restrict the number of port owners to one. Thus, when the home gateway can support multiple end-points for a particular application it will, and if not, it may only permit a single owner.

Figure 8:
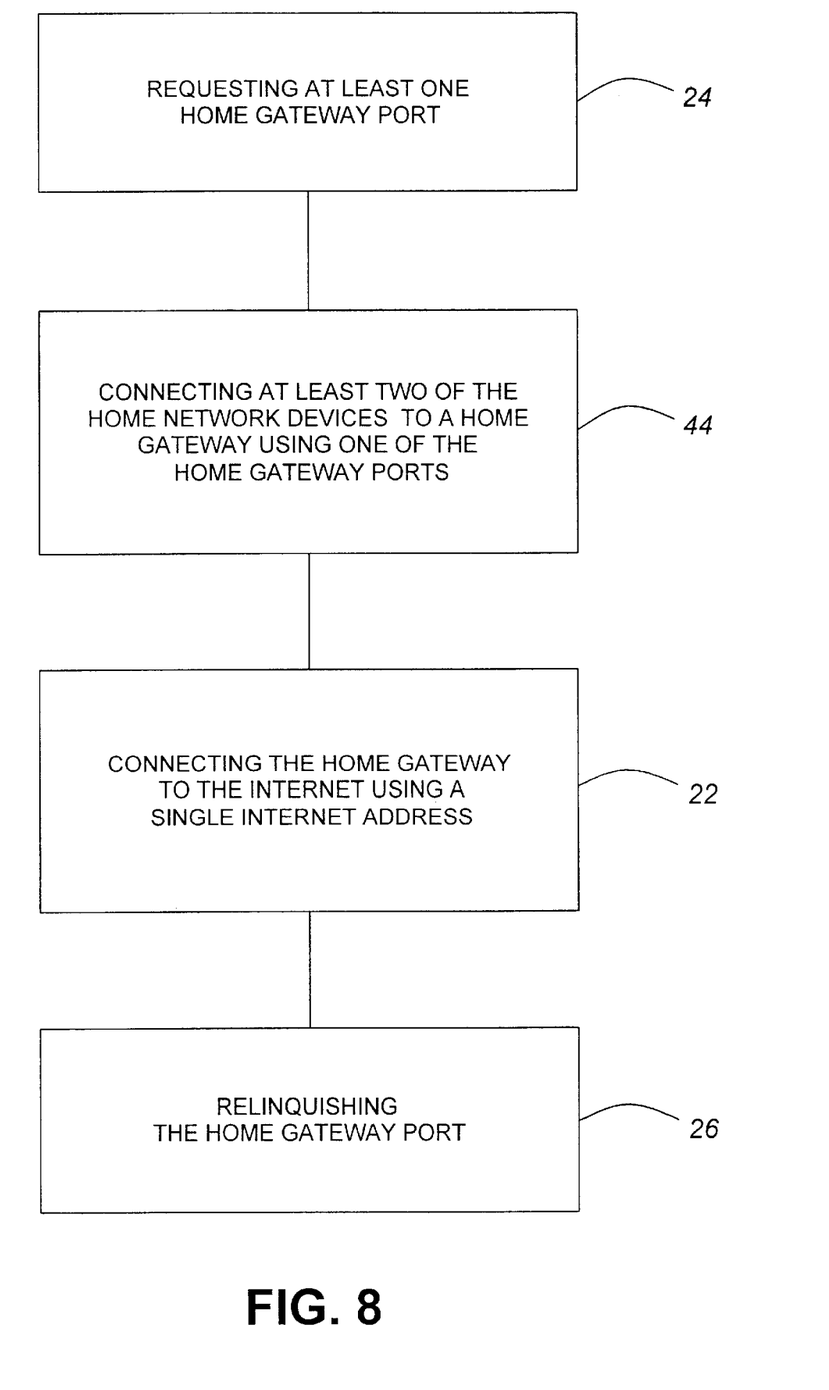
FIG. 8 illustrates a flow chart of the operation of an embodiment on the invention used for a multicast data stream and a client application.

FIG. 8 illustrates a flow chart of the operation of an embodiment on the invention using a multicast data stream and a client application. The method includes the following steps:

requesting at least one home gateway port (step 24);

connecting at least two of the home network devices to a home gateway using one of the home gateway ports (step 44). Step 44 uses a multicast data stream, and at least two client application devices are used as at least two of the home network devices;

connecting the home gateway to the Internet using a single Internet address (step 22).

after the connection between the home gateway and the client application devices is no longer required, relinquishing the home gateway port (step 26).

Telephones or other like devices may be used as the client application devices. Further, the devices showing interest in a particular application may do so at arbitrary points in time.

Figure 9:
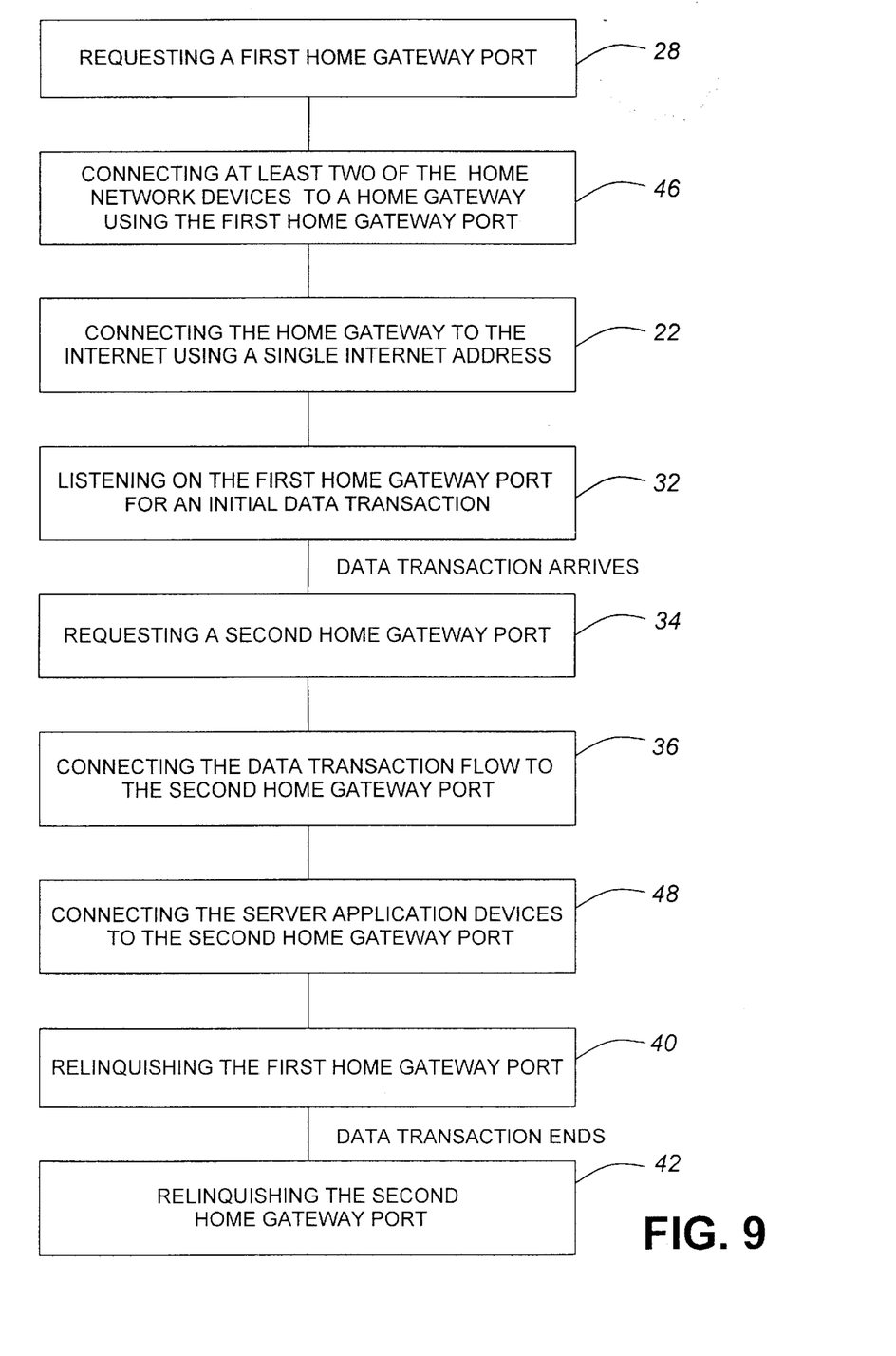
FIG. 9 illustrates a flow chart of the operation of an embodiment on the invention used for a multicast data stream and a server application.

FIG. 9 illustrates a flow chart of the operation of an embodiment on the invention using a multicast data stream and a server application. The method includes the following steps:

requesting a first home gateway port (step 28)

connecting at least one home network device to a home gateway using one of the home gateway ports (step 46). Step 46 uses a multicast data stream, and at least two server application devices as at least two of the home network devices are server application devices;

connecting the home gateway to the Internet using a single Internet address (step 22).

after connecting the server application devices to the first home gateway port, listening on the first home gateway port for an initial data transaction (step 32);

after the initial data transaction arrives, requesting a second home gateway port (step 34). Usually, the first respondent will serve the transaction and the gateway will coordinate whether the other devices can participate. Further, some applications such as load sharing resolve the data stream to unicast after a multicast listening step. Moreover, some applications such as multi-extension, multi-line telephony permit multiple end system to participate in the service simultaneously;

after requesting the second home gateway port, connecting the data transaction flow to the second home gateway port (step 36);

after connecting the data transaction flow to the second home gateway port, connecting the server application devices to the second home gateway port (step 48);

after connecting the server application devices to the second home gateway port, relinquishing the first home gateway port (step 40). Optionally, the server application device may continue to listen for new data transactions on the first port while serving the existing application on the second port; and after the end of the data transaction flow, relinquishing the second home gateway port (step 42).

Telephones or other like devices may be used as the server application devices. Some advantages of the embodiments of the invention are as follows:

- some home devices, such as a phone or fax machine, have a continuous network presence;
- some home devices, such as a World Wide Web (WWW) browser, have an on demand network presence;
- some home devices, such as a printer, have no network presence;
- the home network is arbitrary since each house may be configured differently;
- the home network is decoupled from the administration of the Internet addresses;
- the home network is "plug and play", that is, a minimum level of configuration is required by the user of the home network; and
- the home network locally converts unicast data streams to multicast streams, such as fanning out ringing the all the Internet phones connected to the home network.

Figure 10:
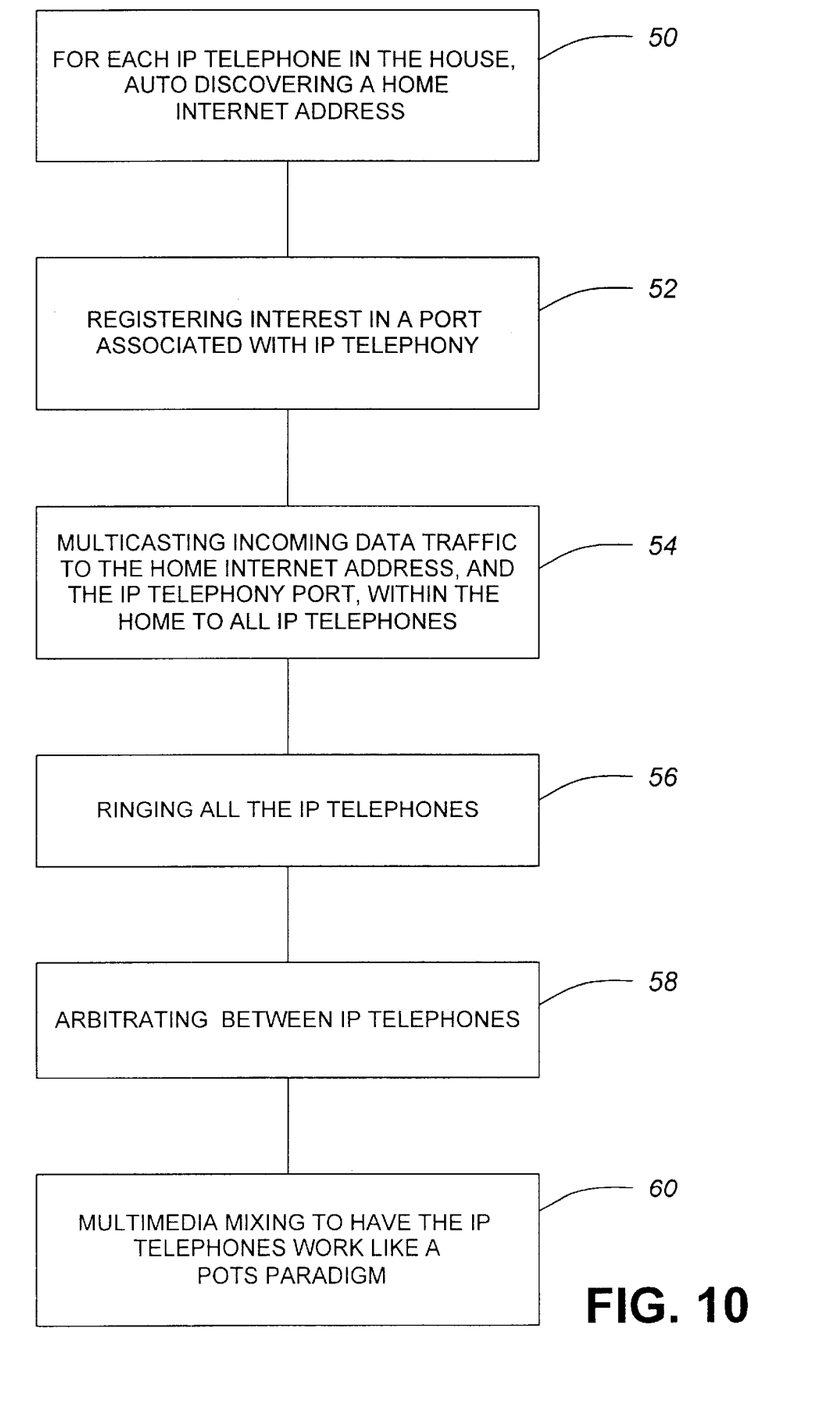
FIG. 10 illustrates a flow chart of the operation of an embodiment of the invention for Internet telephony.

Further embodiments an alternatives of the present invention are now described. Consider first IP telephony as illustrated in the flow chart of FIG. 10. Every IP phone in the houses uses IPRP to autodiscover the public Internet address for the home (step 50), and registers interest in a port associated with IP telephony (step 52). Incoming data traffic to the home Internet address/IP telephony port is multicast within the home to all the IP telephones (step 54). All the IP telephones ring (step 56). Arbitration between phones (step 58) and multimedia mixing (step 60) is usually required to have the phones work like the current POTS paradigm. POTS is usually known as "plain old telephony service", and a POTS paradigm is that all phones in the home behave like they are on a bus. All phones ring and permit users to share a voice connection. Further, the phones may be arbitrarily added or dropped from the call.

Figure 11:
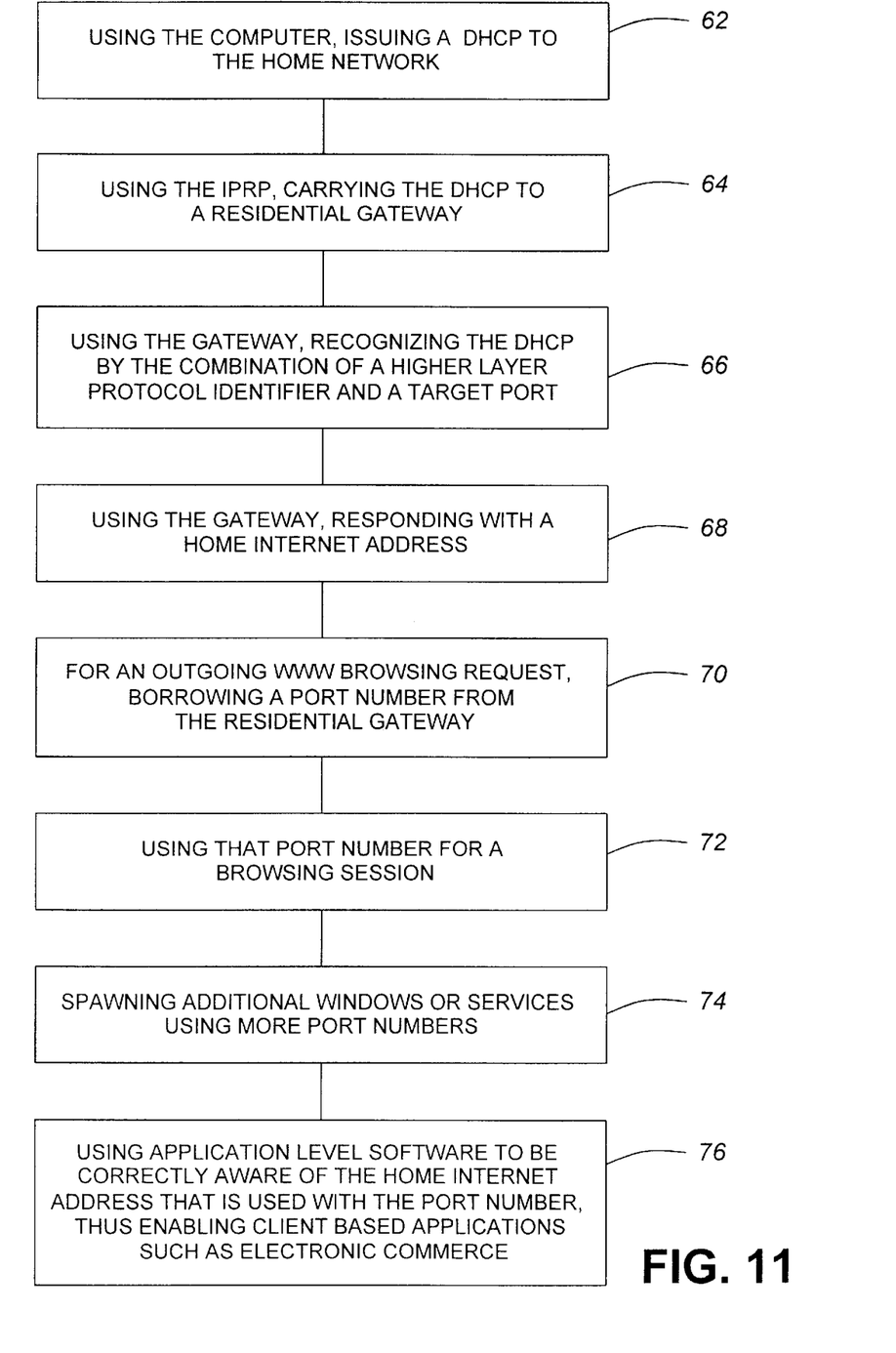
FIG. 11 illustrates a flow chart of the operation of an embodiment of the invention for World Wide Web browsing.

Another embodiment considers a personal computer (PC) on the home network, as illustrated in the flow chart of FIG. 11. When turned on, the PC issues a DHCP to the network (step 62). The IPRP carries this to the residential gateway (step 64). A DHCP is often known as a Dynamic Host Configuration Protocol and is normally used on a LAN for an end-system to discover the details of its network configuration. The gateway recognizes that this is DHCP by the combination of a combination of a higher layer protocol identifier and a target port (step 66). The gate way responds with a home Internet address (step 68). An outgoing WORLD WIDE WEB (WWW) browsing request will borrow a port number from the residential gateway (step 70) and uses that number for the session (step 72). Spawning additional windows or services typically consumes more port numbers (step 74). Application level software is correctly aware of the home Internet address that will be used in the outside port enabling client based applications such as electronic commerce to work (step 76).

Numerous modifications, variations and adaptations may be made to the particular embodiments of the invention described above without departing from the scope of the invention, which is defined in the claims. For example, using the second port may not be a mandatory step for any of the embodiments, rather, it is typically used so a server can service multiple clients while demultiplexing them at the application level using ports.

What is claimed is:

1. A method for connecting a home network to the Internet, the method comprising the steps of:

connecting, using a unicast data stream, at least one client application device to a home gateway using at least one home gateway port;

connecting the home gateway to the Internet using a single Internet address;

autodiscovering, for each of the at least one client application device, the home Internet address;

using one home gateway port in the connecting between the home gateway and the client application device step;

before the connecting between the home gateway and the client application device step, requesting the home gateway port; and after the connecting between the home gateway and the client application device step is no longer required, relinquishing the home gateway port.

2. A method as recited in claim 1, further comprising the step of using a telephone as the client application device.

3. A method as recited in claim 1, further comprising the step of using a facsimile machine as the client application device.

4. A method for connecting a home network to the Internet, the method comprising the steps of:

connecting, using a unicast data stream, at least one server application device to a home gateway using at least one home gateway port;

connecting the home gateway to the Internet using a single Internet address;

autodiscovering, for each of the at least one server application device, the home Internet address;

using one home gateway port as a first home gateway port;

using another home gateway port as a second home gateway port;

before the connecting between the home gateway and the server application device step, requesting the first home gateway port;

after connecting the server application device to the first home gateway port, listening on the first home gateway port for an initial data transaction;

after the initial data transaction arrives, requesting the second home gateway port;

after requesting the second home gateway port, connecting the data transaction flow to the second home gateway port;

after connecting the data transaction flow to the second home gateway port, connecting the server application device to the second home gateway port;

after connecting the server application device to the second home gateway port, relinquishing the first home gateway port; and after the end of the data transaction flow, relinquishing the second home gateway port.

5. A method as recited in claim 4, further comprising the step of using a telephone as the server application device.

6. A method as recited in claim 4, further comprising the step of using a facsimile machine as the server application device.

7. A method for connecting a home network to the Internet, the method comprising the steps of:

connecting, using a multicast data stream, at least two client application devices to a home gateway using at least one home gateway port;

connecting the home gateway to the Internet using a single Internet address;

autodiscovering, for each of the at least two client application devices, the home Internet address;

using one home gateway port in the connecting between the home gateway and the client application devices step;

before the connecting between the home gateway and the client application devices step, requesting the home gateway port; and after the connecting between the home gateway and the client application devices step is no longer required, relinquishing the home gateway port.

8. A method as recited in claim 7, further comprising the step of using telephones as the client application devices.

9. A method for connecting a home network to the Internet, the method comprising the steps of:

connecting, using a multicast data stream, at least two server application devices to a home gateway using at least one home gateway port;

connecting the home gateway to the Internet using a single Internet address;

autodiscovering, for each of the at least two server application devices, the home Internet address;

using one home gateway port as a first home gateway port;

using another home gateway port as a second home gateway port;

before the connecting between the home gateway and the server application devices step, requesting the first home gateway port;

after connecting the server application devices to the first home gateway port, listening on the first home gateway port for an initial data transaction;

after the initial data transaction arrives, requesting the second home gateway port;

after requesting the second home gateway port, connecting the data transaction flow to the second home gateway port;

after connecting the data transaction flow to the second home gateway port, connecting two or more of the server application devices to the second home gateway port;

after connecting the two or more server application devices to the second home gateway port, relinquishing the first home gateway port; and after the end of the data transaction flow, relinquishing the second home gateway port.

10. A method as recited in claim 9, further comprising the step of using telephones as the server application devices.

11. A method for connecting Internet Protocol (IP) telephones on a home network to the Internet using a single Internet address, the method comprising the steps of:

for each IP telephone in the house, autodiscovering the home Internet address;

registering interest in a home gateway port associated with IP telephony;

multicasting incoming data traffic to the home Internet address, and the IP telephony port, within the home to all the IP telephones;

ringing all the IP telephones;

arbitrating between IP telephones; and multimedia mixing to have the IP telephones work like a POTS paradigm.

12. A method for connecting a personal computer on a home network to the Internet using a single Internet address, the method comprising the steps of:

using the computer, issuing a DHCP to the home network;

using the IPRP, carrying the DHCP to a residential gateway;

using the gateway, recognizing the DHCP by the combination of a higher layer protocol identifier and a target port;

using the gateway, responding with the home Internet address;

for an outgoing World Wide Web (WWW) browsing request, borrowing a port number from the residential gateway;

using that port number for a browsing session;

spawning additional windows or services using more port numbers; and using application level software that is correctly aware of the home Internet address that is used with the target port number, thus enabling client based applications such as electronic commerce.

* * * * *